April 21, 1959
O. W. ROTH
2,882,597
UNDER-EDGE BURRING TOOL
Filed Oct. 24, 1955
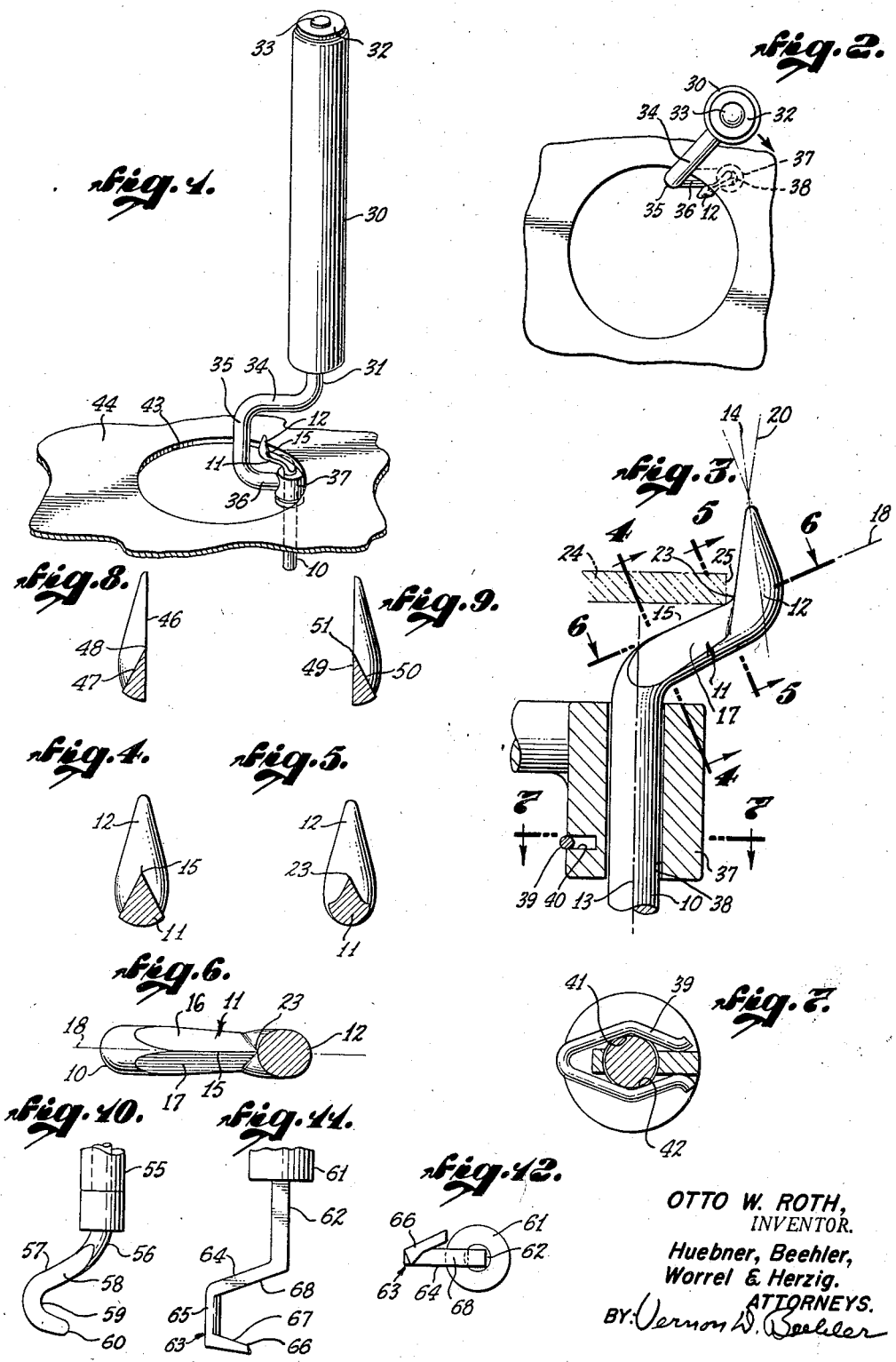
OTTO W. ROTH,
INVENTOR.
Huebner, Beehler,
Worrel & Herzig.
ATTORNEYS.
BY Vernon D. Beehler

United States Patent Office 2,882,597
Patented Apr. 21, 1959

2,882,597

UNDER-EDGE BURRING TOOL

Otto W. Roth, Littlerock, Calif.

Application October 24, 1955, Serial No. 542,291

4 Claims. (Cl. 30—286)

The application refers to mechanics' tools and has particular reference to a tool particularly well adapted to smoothing off the edge of a work-piece which may have been left somewhat rough or ragged as the result of being cut with some conventional tool such as a shear, a drill bit, milling cutter, or other cutting or shaving tool. The invention is an improvement upon my prior Patent No. 2,598,443.

Instances occur in the working of material where when a rough edge is left by some working operation the edge may be on the underside of the work in a position somewhat inaccessible as, for example, when holes are drilled into a sheet material already assembled such as a tank, a housing, or perhaps a fuselage section of an airplane. More particularly when holes which are drilled are small holes, it is virtually impossible to get a tool into a position where the edge on the underside can be deburred smoothly and effectively. In many cases it is extremely essential not only that the edge be deburred but that the edge be left smooth so that fractures in the material due to subsequent flexure or vibration will not start.

Other occasions occur where the material being worked may be a plastic or perhaps a transparent plastic which is apt to show tool marks. In the working of such material whether the rough edge be on an underside or on an exposed side, if the tool is not properly constructed, or perhaps even if properly constructed and not properly handled, the tool may leave a mark on a smooth polished surface adjacent the edge which will be undesirable even though the tool operates effectively and properly so far as performing the work of smoothing off the roughened edge.

It is therefore among the objects of the invention to provide a new and improved burring tool which is capable of effectively removing a rough edge from material cut or punched in some conventional manner under circumstances where the only portion of the burring tool which comes into contact with the work are two points, namely, the cutting edge and a portion of the guiding lip whereby the contact of the lip with the work is on the new surface, thereby making it possible to perform the operation without marring any adjacent portion of the work.

Another object of the invention is to provide a new and improved burring tool which has a somewhat shearing action when removing a rough edge of material and wherein the cutting portion is so constructed that the tool may be applied to the edge at a number of different angles of application without impairing the effectiveness or efficiency of operation of the tool.

Still another object of the invention is to provide a new and improved burring tool which is so constructed and so mounted that the working portion of the tool can be applied to rough edges of material which are relatively inaccessible and there enabled to perform the burring operation with a high degree of effectiveness.

Still further among the objects of the invention is to provide a new and improved convenient hand-operated burring tool which comprises a mounting of a compact sort suited when need be to insertion into a relatively small space such as a drilled hole in such a manner that the cutting portion of the tool can be placed on the underside of the material and there made to perform an effective deburring operation before withdrawal.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a perspective view of the tool showing its position for use in smoothing off the edge of a drilled hole on the underside of a work piece.

Figure 2 is a plan view of the device in the position for operation illustrated in Figure 1.

Figure 3 is an enlarged sectional view showing the position of the cutting portion of the tool when applied to the edge of a work piece.

Figure 4 is a cross-sectional view on the line 4—4 of Figure 3.

Figure 5 is a cross-sectional view on the line 5—5 of Figure 3.

Figure 6 is a sectional view on the line 6—6 of Figure 3.

Figure 7 is a cross-sectional view on the line 7—7 of Figure 3.

Figure 8 is a sectional view corresponding to Figure 4 of a tool ground for special cutting in one direction which, when used in a holder of the type illustrated in Figure 1, would be a counter-clockwise direction.

Figure 9 is a sectional view corresponding to Figure 4 of the cutting edge of a tool ground for special cutting in the opposite direction.

Figure 10 is a side elevational view of a form of the invention featuring a curved knife edge located on a side facing the handle and especially adapted to burring inaccessible edges of very small holes.

Figure 11 is a side elevational view of a form of the invention featuring an undercutting burr-removing edge adapted for holes made through relatively thick material.

Figure 12 is a bottom plan view of the tool of Figure 11.

In the embodiment chosen for the purpose of illustration there is shown a burring or edge-smoothing tool comprising a stem 10 circular in cross-section which extends inwardly to a point of junction with a blade section 11. At the end of the blade section is a conical tip section 12. For purposes of explanation the stem will be indicated as lying on a longitudinal axis 13 and the tip as lying on a longitudinal axis 14. For the proportions selected in the chosen example these axes may conveniently be at an angle of 7½° with respect to each other.

On the blade section is a cutting edge 15 which faces obliquely endwardly with respect to the stem. In the embodiment chosen the cutting edge is the termination of opposite flat sides 16 and 17. The cutting edge for further explanation may be identified as having an axis 18 (Figures 3 and 6).

On the tip section 12 is the smooth conical surface which most closely approaches the work along a line 20. This tip is instrumental in preventing the tool from inadvertently slipping off the work. It will further be noted that there is a rounded inside corner junction 23 where the tip 12 joins the cutting edge 15.

The axis 13 of the stem and the axis 18 of the cutting edge 15 in the example selected lie at an angle with respect to each other of something in excess of 90 degrees.

Moreover, the angle between the axis 18 of the cutting edge 15 and the line 20 of the surface of the conical tip is an obtuse angle greater than the angle between the axes 13 and 18. Hence, when the stem is positioned at right angles with respect to the surface of a work piece 24, the surface of the tip 12 will be directed away from a face 25 of the work piece so that such portion of the tip section as may touch the work piece will ride or bear flat against the new surface or edge formed by removing the burr. Hence, no matter at what tilted angle the stem may be applied with respect to the work piece, there will be no position wherein any portion of the tip section can trace an undesirable mark or line upon the work piece. This will be true whether the stem be tilted toward the right or the left as viewed in Figure 3 and whether or not the stem be directly applied to a top side cutting edge or applied by use of the tool holder in the position illustrated in Figure 1.

When the burring tool is to be used especially for cleaning the edge of a work piece which is located somewhat inaccessibly, there is provided a fixture for the stem 13 which consists of a handle 30 within which a handle shaft 31 is swively mounted. To secure the shaft in the handle a washer 32 may be provided on the upper end held beneath a peened over portion 33. At the end of the shaft which extends below the handle there is what may be aptly termed a laterally open extension formed by a transversely outwardly extending leg 34 attached at its outer end to a joining section 35 at the lower end of which is a transversely inwardly extending leg 36. The leg 36 is slightly shorter than the leg 34 and is offset with respect to the location of the leg 34 as indicated in Figure 2. A bushing 37 is attached to a free end of the leg 36, which bushing is provided with a bearing aperture 38. The axis of the bearing aperture 38 is offset to a considerable degree from the axis of the shaft 31.

The stem 10 is adapted to fit into the bearing aperture 38 with a free rotating or swivelling fit. To hold the stem and therefore the cutting edges at a selected position the stem may be anchored in the bearing aperture by employment of a spring clip 39, the sides of which are receivable in a recess 40 which is deep enough to permit the clip to engage shallow depressions 41 and 42 made in the stem at a selected location so as to fix the rotating position of the stem and consequently the cutting edges.

When the burning tool is to be used without the handle 30, it can be handled by grasping the stem 10 in the fingers and by having the cutting edge 15 applied against a rough edge of the work piece 24 in the position somewhat as occupied by the stem portion of the device, as illustrated in Figure 3, except that as the tool is drawn along the work, the blade pivots in the fingers so that the cutting edge has a slicing action in an oblique direction in advance of the position of travel of the tip 12.

When the underside of a work piece is to be deburred, as for example when a hole 43 is drilled in sheet stock 44, the stem is mounted in the bushing 37 as illustrated in Figure 1. The bushing and the stem can then be inserted into the drilled hole and the cutting edges pressed upwardly against the corner on the underside of the sheet stock by lifting slightly on the handle 30. In the example shown and particularly as illustrated in Figure 2, the angular arrangement of the tool is set for a clockwise rotation in the direction of the arrow as viewed in Figure 2. As the handle is swung about an arc indicated by the arrow, the cutting edges and particularly the curved junction thereof will follow around the edge at the underside and smoothly remove the rough edges and a portion of the material sufficient to leave a clean smooth line. Engagement of the joining section 35 with the edge of the hole serves as a guide.

On some special occasions where the deburring motion will always be in the same direction, the blade section 11 and tip section 12 may be specially ground. Where the tool is to be used with a fixture and handle in the general relationship illustrated in Figure 3, the tool may be ground to present a flat side 46 which with an angularly disposed face 47 forms a cutting edge 48. This will be especially well adapted to movement in a direction corresponding to rotation in a counter-clockwise direction, as viewed in Figure 2.

Contrarily, when a universal type tool such as that described in Figures 1 through 7, inclusive, is not advantageous for deburring in an opposite direction, namely, clockwise, as viewed in Figure 2, for the underside action tool illustrated, the blade may be ground to present a flat side 49 opposite from an angularly disposed side 50 which forms a cutting edge 51. When a blade of this description is mounted in a fixture like that shown in Figure 1 and the fixture rotated in a clockwise direction, the deburring action will be especially effective.

In the form of the device illustrated in Figure 10 a handle 55 has a tool shaft 56 swively mounted therein in substantially the same form and fashion as illustrated in connection with Figure 1. Mounted upon the shaft and in fact constituting part of the shaft is a curved cutting member 57. For convenience and effectiveness one side 58 of the cutting member may be ground flat and the opposite side permitted to remain half rounded as in the instance of the shaft from which it is bent. The cutting member is provided with a cutting edge 59, the sharp portion of which extends to the apex of the curve and, if desired, on the side of the curve adjacent the handle as well as on the side of the curve remote from the handle.

In use the tool just described can be inserted into a drilled hole having a diameter as small as the breadth of the cutting member, leaving a slight working clearance. A blunt end 60 is ordinarily inserted into the hole of small diameter and the cutting member worked around until the blunt end lies below the drilled sheet. The tool is then rotated while pull is exerted upon the handle 55 to bring the lower portion of the edge 59 upward against the under edge of the drill hole. It is, moreover, possible in this form of the device to exert a thrust in the opposite direction upon the handle 55 in order to press the opposite side of the cutting edge 59 against the opposite edge of the drill hole to debur the direct side without changing the position of the cutting member in the hole.

In still another slightly modified form of the device illustrated in Figures 11 and 12, there is shown a handle 61 having a shaft 62 swively mounted therein as previously described. The shaft in this instance also is bent to form a cutting member 63. Inasmuch as this form of the tool is one especially adapted to use on relatively thick material, the cutting member is specially formed with one leg 64 extending annularly outwardly and endwardly to a junction with a spacer leg 65 at the outer end of which is an underside cutting leg 66. An underside cutting edge 67 is ground on the underside cutting leg 66, the sharp portion of which extends to the spacer leg 65. Ordinarily the spacer leg 65 may be rounded for smooth action against the portion of the work piece to be deburred. As a further convenience the leg 64 may have a cutting edge 68 ground thereon and extending endwardly of the shaft 62. It should be noted still further that, as shown in Figure 12, the underside cutting edge 66 is angularly disposed relative to the leg 64 on those occasions where the tool is designed to be rotated in a counter-clockwise direction as viewed from the bottom during the deburring operation when the cutting edge 67 is brought into use. It is, moreover, found convenient to grind the leg 64 in forming the cutting edge 68 on the side facing the leg 66 with the ground faces extending obliquely toward each other so that by the same counter-clockwise rotation of the tool as viewed from beneath both the underside and the top side of a drill hole may be deburred.

It will be obvious further that although the description has especially emphasized the deburring of drill holes, the same relative motion would be employed in deburring straight or elongated curved edges of material of substantially the same thickness as that in holes are drilled. The material upon which the tool of Figures 11 and 12 may be operated is limited to a thickness substantially equal to the length of the spacer leg 65 less a slight working clearance.

There has accordingly been shown and described herein a cutting tool which is a marked improvement over the prior tools herein referred to in that it is especially capable of making a fine accurate cut without danger of marring any adjacent surface of the material and furthermore a tool which, provided with the special fixture herein disclosed, is capable of effectively smoothing off inaccessible edges of material.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A tool for smoothing an edge of a work piece comprising a stem, a cutting blade having a longitudinal axis thereof extending angularly outwardly and endwardly of the stem wherein one side of the blade forms an outside angle with the stem, a cutting edge on the portion of the blade forming the outside angle and a blade extension extending from a free end of the blade endwardly of the stem and having a smooth endwardly converging wall, said blade extension being joined to the blade and being rounded throughout its length, said blade extension and the wall thereof having an operating position tilted outwardly away from the work and in sliding and non-cutting relationship with the work, a portion of said wall adjacent the blade forming an obtuse inside angle with the longitudinal axis of the cutting edge of the blade.

2. A tool for smoothing an angular edge of a work piece comprising a stem, a cutting blade having a longitudinal axis thereof extending angularly outwardly and endwardly of the stem wherein one side of the blade forms an inside angle and an opposite side forms an outside angle with the stem, a cutting edge on the portion of the blade forming the outside angle and a blade extension extending from a free end of the blade endwardly of the stem and having a smooth endwardly converging wall on the blade extension joining the blade, said wall being circumferentially rounded and of radii diminishing progressively toward the end and adapted to face the work, said wall having a rounded junction with the cutting edge, a portion of said smooth endwardly converging wall extending past the cutting edge, said wall having an operative position tilted outwardly away from the work, a portion of said wall forming an inside obtuse angle in excess of 90° with the longitudinal axis of the cutting edge of the blade, a selected portion of said wall being adapted to slide upon the work during a cutting operation.

3. A tool for smoothing rough edges of material comprising a shaft, a handle on the shaft, a laterally open extension on said shaft comprising a transversely outwardly extending leg, a joining section and a transversely inwardly extending leg, a cutting tool comprising a stem swivelly retained on said inwardly extending leg, a blade on the stem having the longitudinal axis extending angularly outwardly and endwardly toward the handle, said blade having a side generally facing said handle and a cutting edge on said side.

4. A tool for smoothing rough edges of material comprising a shaft, a swivel handle on the shaft, a laterally open extension on said shaft comprising a transversely outwardly extending leg, a joining section and a shorter transversely inwardly extending leg, said legs having an acute angular deviation one from the other, a bushing on a free end of said last identified leg having a rotational axis thereof offset with respect to the axis of the shaft, a cutting tool comprising a stem swivelly retained in said bushing, a blade on the stem having the longitudinal axis extending angularly outwardly and endwardly toward the handle, said blade having a side generally facing said handle and a cutting edge on said side, a blade extension pointing in a direction generally parallel to and toward the handle, and a smooth surface on said extension sloping angularly outwardly toward a free end of the extension and forming an inside angle with the cutting edge on said blade.

References Cited in the file of this patent
UNITED STATES PATENTS

| | | |
|---|---|---|
| 2,359,607 | Bashara | Oct. 3, 1944 |
| 2,598,443 | Roth | May 27, 1952 |